Patented Aug. 14, 1945

2,382,548

UNITED STATES PATENT OFFICE 2,382,548

ESTERS AND METHOD OF PREPARING THE SAME

James D. D'Ianni, Akron, Ohio, assignor to Wingfoot Corporation, Akron, Ohio, a corporation of Delaware No Drawing. Application June 14, 1941,
Serial No. 398,168

9 Claims. (Cl. 260—487)

This invention relates to dihalopropionic esters and to an improved method of preparing the same. More particularly, it relates to a method in which these esters are prepared from nitriles of the acrylic series by treatment of the nitrile with a halogen and an alcohol in a one-step reaction.

Heretofore, dihalopropionic esters have been prepared by reactions requiring a number of operations to bring about the desired result. It has now been found that this preparation can be effected in a manner whereby all of the reactions involved take place more or less simultaneously or, at least, in one treatment of the starting material with the reagents involved. Thus, acrylonitrile may be mixed with ethyl alcohol in an acid aqueous medium and a halogen passed into the mixture. The reaction which ensues is usually exothermic requiring cooling and, after absorption of approximately the theoretical amount of halogen, the desired ester, ethyl alpha, beta-dihalopropionate may be separated by appropriate means. Selecting chlorine as the halogen, the reaction is indicated by the following equation:

Several reactions are involved in the process but the equation given above expresses the result obtained; thus, the acrylonitrile is halogenated and the nitrile radical is hydrolyzed in the presence of the acid to a carboxyl group. The carboxylic acid is then esterified by the alcohol and the ammonia released by the hydrolysis of the nitrile combines with the acid to form a salt. All of these steps appear to take place in rapid succession and the result is the desired ester which is obtained with ease and in good yield. It will be obvious that such a method has advantages over those in which halogenation takes place in one operation and this product is then removed and subsequently hydrolyzed and esterified in other steps.

To illustrate the method, the following examples are given but the invention is not limited thereto.

Example 1

To a mixture of 450 ml. of 95% ethanol and 90 ml. of water was added 325 ml. of 92% sulfuric acid, the mixture being stirred and cooled during the addition. When the temperature had dropped to 30° C. 330 ml. (5 mols) of acrylonitrile was added and chlorine was passed in. During the reaction, which took place rapidly, the temperature was kept at 40–50° C. by use of a cold water bath. Chlorination was stopped after the absorption of 350 grams of $Cl_2$ as compared with the theoretical amount of 355 grams. The reaction mixture was distilled on the water pump at 50–60 mm. pressure until the organic layer had been completely removed from the salt residue of ammonium bisulfate. The ester was separated, washed with sodium bicarbonate solution, dried and fractionated to give a yield of 675 grams (79%) of a product having a boiling point above 60°C./50 mm. Practically all of the product distilled at 90–100° C./45 mm. and had the following physical properties: $N_D^{32}=1.4400$, $D^{32}=1.212$. $MR_D$ calc. 36.9; found, 37.2.

Example 2

Chlorine was passed rapidly, with stirring, into a solution containing 90 ml. of water, 300 ml. of methanol, 325 ml. of sulfuric acid and 330 ml. of acrylonitrile (5 mols) at a temperature of 65–70° C. When approximately the theoretical amount had been absorbed, a period of 3–4 hours being necessary, the product was distilled out under 60 mm. pressure, washed with water and bicarbonate solution, dried and fractionated. A yield of 522 grams (67%) of methyl dichloropropionate was obtained having a boiling point of 100–110° C./50 mm. Other properties of the ester were $N_D^{26}=1.4458$, $D^{25}=1.288$, $MR_D$ calc. 32.3; found, 32.5.

Example 3

In a similar manner there were caused to react 178 ml. (3 mols) of acrylonitrile, 350 ml. of 2-propanol, 54 ml. of water and 195 ml. of concentrated sulfuric acid, together with chlorine to approximate saturation. There was obtained 140 grams of isopropyl dichloropropionate with a boiling point of 110–115° C./60 mm. Other properties were: $N_D^{27}=1.4500$, $D^{27}=1.249$.

Example 4

Again, a mixture of 375 ml. of n-propyl alcohol, 90 ml. of water, 325 ml. of concentrated sulfuric acid and 330 ml. (5 mols) of acrylonitrile was treated with chlorine to obtain 469 grams of n-propyl dichloro propionate. This ester had the following properties: B. P. 105–120° C./50 mm., $N_D^{25}=1.4470$, $D^{25}=1.185$, $MR_D$ calc. 41.4; found, 41.6. This constitutes a 51% yield based on the nitrile or a 64% yield based on the amount of chlorine actually added.

The method can be applied, of course, to the preparation of other esters of similar character as, for example, the preparation of the dihalopropionic esters of the following alcohols: methyl, ethyl, propyl, isopropyl, butyl, isobutyl, amyl, isoamyl, chloroethyl, benzyl, tetrahydrofurfuryl and cyclohexyl carbinol, including not only the dichloro propionates but also the dibromo propionates of any of the foregoing alcohols. Other acids which may be used are phosphoric and phosphorous acids.

The method is important for the preparation of intermediates which can be converted, in turn, to alpha-haloacrylates by removal of hydrogen halide from the propionate. Such unsaturated esters are of use in the preparation of polymerized materials for industrial use.

While there have been described above the preferred embodiments of the invention, it will be apparent to those skilled in the art that various modifications and changes may be made therein without departing from the spirit of the invention or from the scope of the appended claims.

I claim:

1. A method of preparing dihalopropionic esters which comprises treating acrylonitrile concurrently with a halogen and an alcohol in an acidic medium.

2. A method of preparing dihalopropionic esters which comprises treating acrylonitrile concurrently with a halogen and an aliphatic alcohol in the presence of an acid.

3. A method of preparing dichloropropionic esters which comprises treating acrylonitrile concurrently with chlorine and an alcohol in an acidic medium.

4. A method of preparing methyl alpha, beta-dichloropropionate which comprises treating acrylonitrile in an acidic medium with chlorine in the presence of methyl alcohol.

5. A method of preparing propyl alpha, beta-dichloropropionate which comprises treating acrylonitrile in an acidic medium with chlorine in the presence of propyl alcohol.

6. A method of preparing dihalopropionic esters which comprises treating acrylonitriles concurrently with a halogen and an alcohol in an aqueous sulphuric acid medium.

7. A method of preparing dichloropropionic esters which comprises treating acrylonitrile concurrently with chlorine and an aliphatic alcohol in an aqueous medium containing sulphuric acid of at least about 70% strength.

8. A method of preparing dichloropropionic esters which comprises treating acrylonitrile concurrently with chlorine and an alcohol up to amyl alcohol in the aliphatic series in an aqueous medium containing sulphuric acid of at least about 70% strength.

9. A method of preparing ethyl dichloropropionate which comprises treating acrylonitrile concurrently with chlorine and ethyl alcohol in an equous solution of sulphuric acid of about 70% strength.

JAMES D. D'IANNI.